(12) United States Patent  
Lelieveld-Amiro et al.

(10) Patent No.: US 8,621,124 B2  
(45) Date of Patent: Dec. 31, 2013

(54) SYSTEM, METHOD, AND OPERATING INSTRUCTION FOR IMPROVED DATA STORAGE/RETRIEVAL

(75) Inventors: Brendan Lelieveld-Amiro, Ottawa (CA); Philip C. Bretzlaff, Manotick (CA); Ryan Lindsey, Ottawa (CA)

(73) Assignee: StorageQuest Inc., Irvine, CA (US)

( * ) Notice: Subject to any disclaimer, the term of this patent is extended or adjusted under 35 U.S.C. 154(b) by 171 days.

(21) Appl. No.: 13/187,103

(22) Filed: Jul. 20, 2011

(65) Prior Publication Data

US 2013/0024858 A1 Jan. 24, 2013

(51) Int. Cl.
*G06F 3/00* (2006.01)
*G06F 13/00* (2006.01)
*G06F 9/455* (2006.01)

(52) U.S. Cl.
USPC ............. 710/74; 710/5; 710/303; 718/1

(58) Field of Classification Search
USPC .......................... 710/74, 1, 5; 718/1
See application file for complete search history.

(56) References Cited

U.S. PATENT DOCUMENTS

2009/0112358 A1* 4/2009 Gallo et al. ............. 700/214
2012/0079499 A1* 3/2012 Gold et al. .............. 718/105

* cited by examiner

*Primary Examiner* — Farley Abad
(74) *Attorney, Agent, or Firm* — Patent Law & Venture Group; Gene Scott

(57) ABSTRACT

A method of operating a data library system wherein a host requests media movements from storage slots to and from media drives and also data operations on the media and wherein an operations controller responds to the host with virtual movements of the media according to a protocol associated with a robotic library.

1 Claim, 3 Drawing Sheets

SYSTEM, METHOD, AND OPERATING INSTRUCTION FOR IMPROVED DATA STORAGE/RETRIEVAL

BACKGROUND

The present method relates to the field of data storage systems and in particular the use of the so-called optical jukebox and similar systems for data storage and also the software that is used to operate said systems. Contemporary optical jukeboxes and similar data storage systems typically store a large number of medium storage devices such as optically read/write disks, and provide a number of computer drives which may be loaded with the storage disks for gaining read/write access to the data stored thereon. Access time in these contemporary storage systems is slowed due to drive loading and unloading time and robot movements of media. Another drawback of contemporary systems is that the automated robotic movers are prone to mechanical failure. A solution is needed that is able to eliminate disk loading time and improve reliability of the system.

SUMMARY

The present disclosure defines a virtual robotic library, the "system," and the manner in which it operates, the "method," and a software program that produces the method. The system includes a server computer and a virtualization software program housed in non-volatile memory which defines and controls how the computer server functions as a robotic library as described in this written specification including the following detailed description and claims and as shown in the attached figures. The system also includes a plurality of physical data storage medium. The system operates in conjunction with and supports host server computers which communicate with the system requesting stored information from the system and sending information to the system for storage. The presently described virtual robotic library is distinct from prior art robotic libraries in that it does not use a pick and place robot and does not move its medium between physical slots and drives. However, to a host computer the system appears to be identical to conventional optical jukeboxes. This may be commercially important in that the software protocol for interfacing with and controlling a robotic library by a host is in place already. Therefore, when a conventional library is replaced by an improved library in accordance with this disclosure, the improved library must be able to communicate with the host without changing the software protocol, that is, the improved library must be able to appear to the host to be a conventional library.

A conventional library has plural drives, plural discs, plural storage slots, plural mail slots, and at least one robot capable of moving the discs between the drives, storage slots and mail slots.

The presently described virtual library, in one embodiment, has plural drives and plural discs. No storage slots, mail slots or robots are needed or used.

The presently described virtual library, in another embodiment, has plural discs each mounted on a drive. No storage slots, mail slots or robots are needed or used.

In one aspect of the present method, instructions from a host to store a host's medium in a storage slot or bin results in mounting the medium on a drive and recording the drive identification corresponding to a virtual slot identification while acknowledging the virtual slot identification to the host.

In another aspect of the present method, instructions from a host to mount a host's medium on a drive results simply in acknowledging that the host's medium has been mounted on the drive.

In another aspect of the present method, instructions from a host to operate on the host's medium results in following the host's operational orders and acknowledging to the host.

In another aspect of the present method, instructions from a host to move the host's medium from a drive to a storage slot or bin results in acknowledging to the host of moving the medium to a virtual slot and recording the virtual slot identification as associated with the drive.

In another aspect of the present method, instructions from a host to store a host's medium in a storage slot or bin results in copying data from the medium onto a drive and recording the corresponding drive and location corresponding to a virtual slot identification while acknowledging the virtual slot identification to the host.

In another aspect of the present method, instructions from a host to move the host's medium from a drive to a storage slot or bin results in acknowledging to the host of moving the medium to a virtual slot and recording the virtual slot identification as associated with a drive and drive location identification.

The details of one or more embodiments of these concepts are set forth in the accompanying drawings and the description below. Other features, objects, and advantages of these concepts will be apparent from the description and drawings, and from the claims.

DESCRIPTION OF THE DRAWINGS

Like reference symbols in the various drawings indicate like elements.

DETAILED DESCRIPTION

Figure 1:
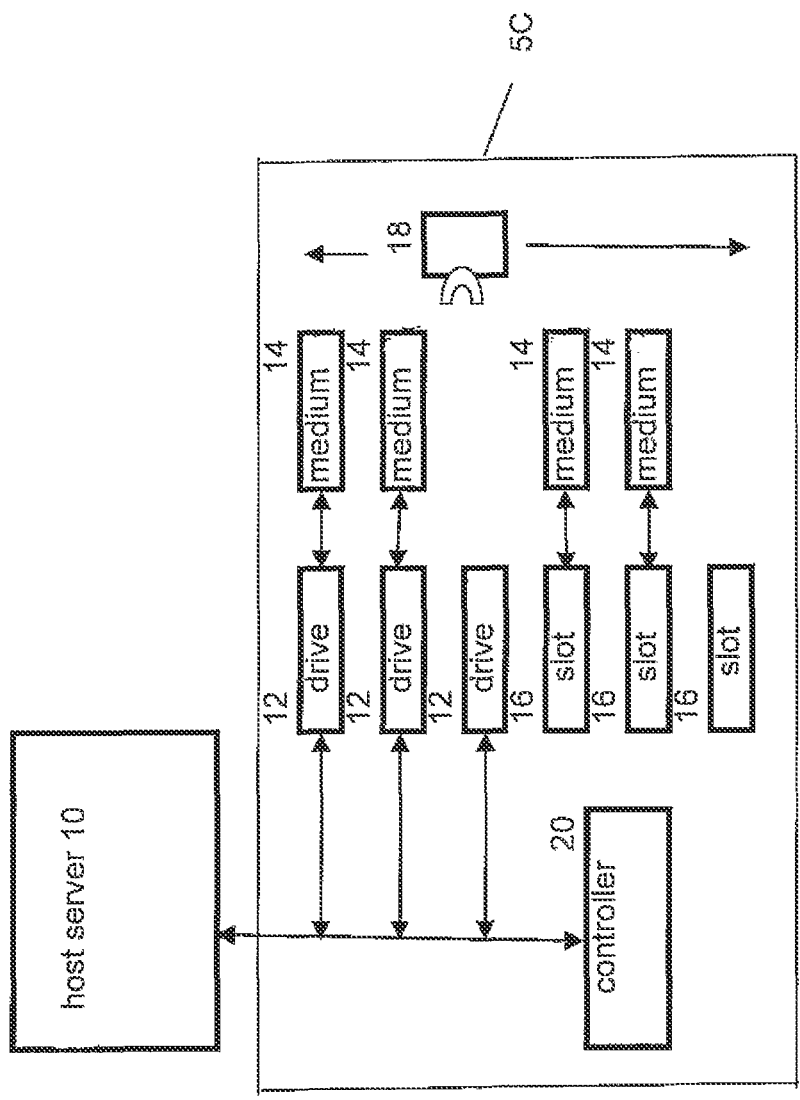
FIG. 1 is a block diagram defining an example of a conventional optical jukebox system.

This description defines an improved optical storage system 5 (FIG. 2) comparing it to a prior art conventional optical storage system 5C (FIG. 1), both of which may be known by the name "optical jukebox." Physical attributes, methods of use, and software characterizations are compared. One or more computers, host 10, communicate with the storage systems 5 or 5C according to a software protocol familiar with the operators of host 10 when using system 5C. Operations include mounting and ejecting storage media 14, and reading/writing/erasing of the data on such media 14. When the improved system 5 is substituted for system 5C, system 5 must be able to appear to the host 10 to actually be a conventional system 5C in order to accommodate the software protocol and operator familiarity with system 5C. In this description, terms that will be used throughout are defined in the following paragraphs.

The term "data" as used herein, refers to information digitally coded on media 14 and therefore is able to be processed by system 5. The terms "data" and "information" may be used interchangeably. The media 14, as referred to herein, is any physical device that is able to be data encoded temporarily, or permanently, and is capable of being operated on for read/ write/erase data operations. Examples of media 14 are: optical disks, opto-magnetic disks, magnetic disks, and magnetic tapes.

The term "drive 12" as used herein, refers to any physical device that is capable of physically interacting with, and operating on media 14 for the above mentioned operations. Typically, a medium 14 is mounted on a drive 12 for such operations and later dismounted or ejected from drive 12 for removal of the medium 14. The term "virtual drive 12V" refers to a hypothetical or virtual physical drive which is not shown in FIG. 2 since it is merely a concept without physical form. In this respect, FIGS. 1 and 2 appear to be quite similar except that system 5C uses a robot 18 in order to move media 14 between drives 12 and storage slots 16, while media 14 are not moved but remain in drives 12 until they are rejected from a drive 12 and from system 5.

The term "virtual storage slot 16V," as used herein, refers to a hypothetical or virtual storage location that hypothetically stores a media 14. The term "storage slot 16," as used with system 5C refers to a real storage location wherein media 14 may be placed by robot 18 when not mounted in a drive 12. As used with respect to system 5, a storage slot 16 is a hypothetical non-drive location that is actually a drive 12 that happens to not be addressed by controller 20 at the moment. When this drive 12 is addressed by controller 20 it is no longer referred to as a storage slot 16 by rather by its actual identity; drive 12.

The term "robot 18" is used herein to refer to any electro-mechanical apparatus that is capable of accessing media 14 so as to move media 14 from one location to another location within system 5C. System 5 does not use a robot 18 and has no need for such.

FIG. 1 illustrates an example of the conventional system 5C. Host 10 is able to direct commands to system 5C controlling robot 18 for moving media 14 between drives 12 and storage slots 16, and for directing data operations on media 14 when mounted in drives 12.

Figure 2:
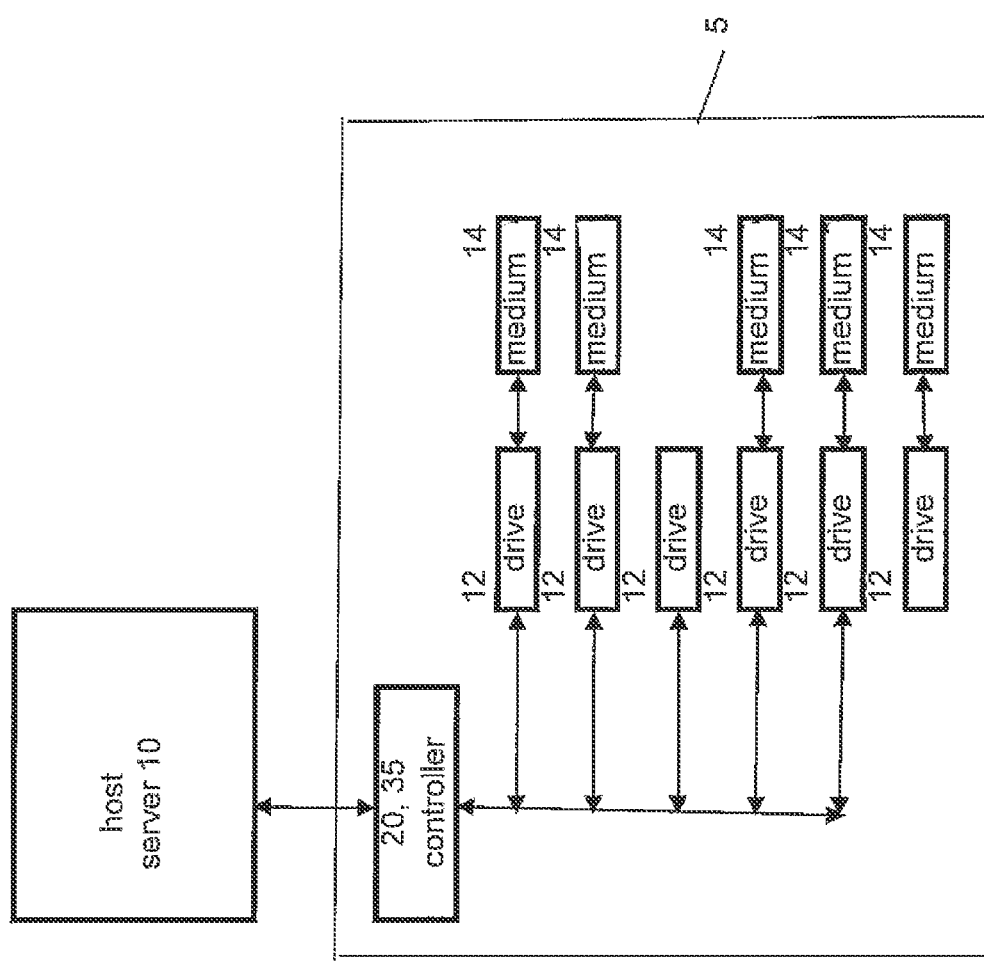
FIG. 2 is a block diagram defining an example of an improved optical jukebox system, the subject of this disclosure.

FIG. 2 illustrates a first of three embodiments in this detailed description of the improved data storage system 5. Here, controller 20 has a means for maintaining drive status information, typically a magnetic or electrostatic solid state memory, and a means for exchanging information, i.e., a processor and exchange circuitry or hardware, as is well known in the art, and so is able to communicate and exchange information with at least one host 10. System 5 provides plural physical drives 12 which are in communication with controller 20. A means for transferring initializing status information from the controller 20 to host 10 is well known and not distinct from the circuits typically used for such information transfer, which in this may transfer the identity and state of a plurality of the virtual storage slots 16V and a plurality of virtual drives 12V. A means for inserting the medium 14 into one of the physical drives 12 may include a live technician and does not include a robot 18. A coded instruction 35 (software program) provides the means for updating, via computer processing steps, drive status information in the controller 20 including the status of media 14 which may be mounted in drives 12. The coded instruction 35 provides a means for updating the status information in the host 10 by assigning the medium 14 to one of the virtual storage slots 16V, a means for transferring a first command from the host 10 to the controller 20 requesting movement of the medium 14 from the one of the virtual storage slots 16V, to one of the virtual drives 12V, a means for confirming completion of the first command by the controller 20 to the host 10. In like manner, a means for transferring a second command from the host 10 to the controller 20 requesting read/write/erase actions on the medium 14, a means for executing the second command by performing the read/write/erase actions on the medium 14, a means for confirming completion of the second command by the controller 20 to the host 10, a means for transferring a third command from the host 10 to the controller 20 requesting movement of the medium 14 from a virtual drive 12V, to a virtual storage slot 16V, a means for confirming completion of the third command by the controller 20 to the host 10; and, a means for updating the status information in the host 10 by assigning the medium 14 to one of the virtual storage slots 16V. The foregoing means include program code enabled for carrying out these several steps, and for each said step such code is within the ability of those of skill in the field of this disclosure. However, the particular application, sequencing of the steps and the utilization of the particular steps disclosed here, and not others, or in a different way, is not known in the art, and is not known to be practiced.

Figure 3:
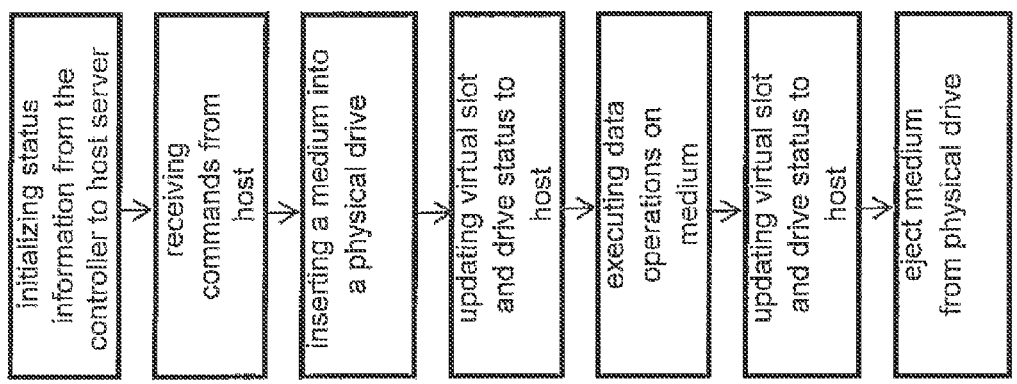
FIG. 3 is a process diagram of an example method of the improved optical jukebox system.

FIG. 3 defines a second embodiment concerning the improved data storage system 5 and which enables an understanding of a preferred method of operating the improved data storage system 5, which includes: initializing status information from the controller 20 to the host 10 which includes the identity of the plurality of virtual storage slots 16V, and the plurality of virtual drives 12V; inserting a medium 14 into one of the physical drives 12; updating the drive status information in the controller 20 by assigning the medium 14 to the one of the physical drives 12; updating the status information in the host 10 by assigning the medium 14 to one of the virtual storage slots 16V; transferring a first command from the host 10 to the controller 20 requesting movement of the medium 14 from the one of the virtual storage slots 16V, to one of the virtual drives 12V; confirming completion of the first command by the controller 20 to the host 10; transferring a second command from the host 10 to the controller 20 requesting read/write/erase actions on the medium 14; executing the second command by performing the read/write/erase actions on the medium 14; confirming completion of the second command by the controller 20 to the host 10; transferring a third command from the host 10 to the controller 20 requesting movement of the medium 14 from the one of the virtual drives 12V, to one of the virtual storage slots 16V; confirming completion of the third command by the controller 20 to the host 10; and, updating the status information in the host 10 by assigning the medium 14 to one of the virtual storage slots 16V.

A third embodiment described here defines the software program 35 of the improved data storage system 5 which may operate on one or more processor readable storage devices, such as solid state memory devices which have processor readable code embodied on the processor readable storage devices, and may be enabled for programming one or more processors of the controller 20 and of the host 10 causing processor steps which may include: transferring a status information from the controller 20 to the host 10, the status information including virtual storage slot identities and virtual drive identities; reading a medium 14 into a physical drive 12; updating the status information in the controller 20 by assigning the medium 14 to the physical drive 12; updating the status information in the host 10 by assigning the medium 14 to one of the virtual storage slot identities; transferring, from the host 10 to the controller 20, a first command requesting movement of the medium 14 from the one of the virtual storage slots, to one of the virtual drive identities; confirming completion of the first command by the controller 20 to the host 10; transferring a second command from the host 10 to the controller 20 requesting read/write/erase actions on the medium 14; executing the second command by performing the read/write/erase actions on the medium 14; confirming completion of the second command by the controller 20 to the host 10; transferring a third command from the host 10 to the controller 20 requesting movement of the medium 14 from the one of the virtual drive identities, to one of the virtual storage slot identities; confirming completion of the third command by the controller 20 to the host 10; and, updating the status information in the host 10 by assigning the medium 12 to the one of the virtual storage slot identities.

Three preferred embodiments have been described herein. Nevertheless, it will be understood that various modifications may be made without departing from the spirit and scope of this disclosure. Accordingly, other embodiments are within the scope of the following claims.

The invention claimed is:

1. A method for operating an improved data storage system wherein the improved data storage system has:
- a physical drive with a host medium loaded therein;
- a controller of the data storage system, the controller enabled for maintaining status of the physical drive, and for exchanging information with a remote host server;

the method comprising:
- the controller identifying to the host server a plurality of virtual storage slots and a plurality of virtual drives of the data storage system, wherein the virtual storage slots and virtual drives are adapted for being recognized by the host server as physical storage slots and physical drives;
- the host server initially commanding the controller to assign the host medium to a selected one of the virtual storage slots, said selected one of the virtual storage slots being recognized as the physical drive;
- the host server commanding the controller to move the host medium from the selected one of the virtual storage slots, to a selected one of the virtual drives, said selected one of the virtual drives being recognized as the physical drive;
- the controller confirming to the host server the move of the host medium from the selected one of the virtual storage slots, to the selected one of the virtual drives, said selected one of the virtual drives being recognized as the physical drive;
- the host server commanding the controller to execute at least one of a read, write, and erase actions on the host medium in the selected one of the virtual drives, said selected one of the virtual drives being recognized as the physical drive;
- the controller executing the at least one of said read, write, and erase actions on the host medium, and confirming said execution to the host server;
- the host server commanding the controller to move the host medium from the selected one of the virtual drives to a selected one of the virtual storage slots, said selected one of the virtual storage slots being recognized as the physical drive;
- the controller confirming to the host server the move of the host medium from the selected one of the virtual drives, to a selected one of the virtual storage slots, said selected one of the virtual storage slots being recognized as the physical drive, and assigning the host medium to the selected one of the virtual storage slots.

* * * * *